Figures 1, 2:
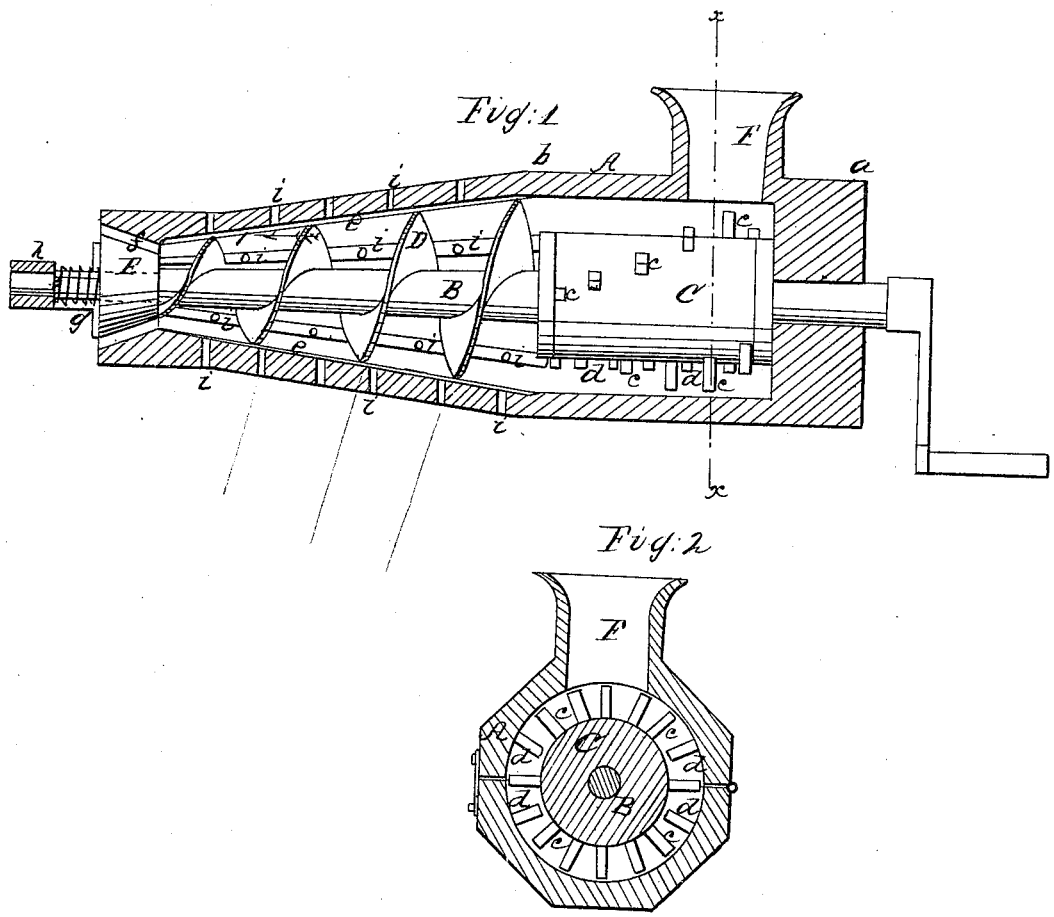

M. W. HELTON.
CIDER MILL.

No. 19,421. Patented Feb. 23, 1858.

UNITED STATES PATENT OFFICE.

M. W. HELTON, OF BLOOMINGTON, INDIANA.

CIDER-MILL.

Specification of Letters Patent No. 19,421, dated February 23, 1858.

*To all whom it may concern:*

Be it known that I, M. W. HELTON, of Bloomington, in the county of Monroe and State of Indiana, have invented a new and Improved Cider-Mill; and I do hereby declare that the following is a full, clear, and exact description of the same, reference being had to the annexed drawings, making a part of this specification, in which—

Figure 1, is a longitudinal central section of the shell or case of my improvement. Fig. 2, is a transverse section of the shell and cylinder of ditto, taken in the line (*x*) (*x*) Fig. 1.

Similar letters of reference indicate corresponding parts in the two figures.

This invention has for its object the manufacturing of cider direct from the fruit at one operation, that is to say, the grinding of the fruit into pomace and the expressing of the juice therefrom by one and the same machine and at the same time.

The invention consists in the peculiar means employed for attaining the above object as will be hereinafter fully shown and described.

To enable those skilled in the art to fully understand and construct my invention I will proceed to describe it.

A represents a shell or case which may be constructed of wood or metal. One portion of the shell viz.—from *a*, to *b* is of cylindrical form, the other portion being of conical form. The interior of the conical portion of the shell decreases in diameter from its inner toward its outer end, as shown clearly in Fig. 1.

B represents a shaft which is fitted longitudinally within the shell or case A at its center. On this shaft a cylinder C is placed, said cylinder being within the cylindrical portion of the shell. This cylinder has teeth (*c*) projecting radially from its periphery. Said teeth being placed in spiral rows on the cylinder—two or more rows may be employed as desired.

The interior of the cylindrical portion of the shell also has teeth (*d*) projecting from it. These teeth are placed in longitudinal rows and any proper number of rows may be used, and the teeth are placed at a suitable distance apart so that as the cylinder C rotates its teeth (*c*) may pass between them. The cylinder C extends the whole length of the cylindrical portion of the shell, and the cylinder is sufficiently less in diameter than the interior of the shell, so that the teeth (*c*) (*d*) may be of the requisite length and a sufficient space be allowed between the cylinder and shell to enable the device to work efficiently.

On the shaft B and within the conical portion of the shell A a spiral or screw flanch D is placed. This screw is of taper form so as to correspond with the form of the portion of the shell in which it is placed. The edge of the screw D is in contact with the inner surface of the shell or with the surfaces of its prominences, for the surface of the conical portion of the shell is corrugated or grooved longitudinally, as shown at (*e*) Fig. 1.

The orifice *f* of the conical portion of the shell is of taper or conical form but in a reverse position to the conical portion of the shell in which the screw is placed, the orifice increasing in diameter from its inner to its outer end. On the shaft B and within the orifice a conical stopper E, is placed. This stopper is allowed to slide on the shaft B, but is made to turn with it, the shaft in order to effect this being of polygonal form, that is, the portion of it on which the stopper is fitted and works. A spiral spring (*g*) is placed around the shaft B, and between the stopper E and the bearing (*h*) of the shaft. This spring has a tendency to keep the stopper E closed within the orifice (*f*).

F is a hopper placed at the outer part of the cylindrical portion of the shell, and (*i*) are holes made through the conical portion of the shell.

The operation is as follows.—Motion is given the shaft B in any proper manner and the apples are thrown into the hopper F and pass down between the cylinder C and the cylindrical portion of the shell A and are ground into pomace by the teeth (*c*) (*d*). The pomace as it is ground is forced along by the screw D in the direction indicated by the arrow 1, and its discharge from the orifice (*f*) is resisted by the stopper E which is acted upon by the spring (*g*). This resistance of the stopper E in connection with the taper screw and taper portion of the shell subjects the pomace to a pressure and the juice is consequently expressed therefrom and passes out through the perforations (*i*) into a conveying spout arranged in any proper way.

By this simple device apples may be ground into pomace and the juice expressed therefrom at one operation, by one and the same machine, and in a perfect manner. A greater or less pressure may be given the pomace by having springs (*g*) of greater or less strength and also by varying the speed of the screw D and regulating the amount of the feed.

I would remark that the grooves (*e*) in the taper portion of the shell are to prevent the pomace from turning within the screw and thereby cause the screw to act effectually in compressing the pomace and in feeding it toward the discharge end of the shell.

I do not claim separately the toothed cylinder C, for that is a common device for grinding apples, nor do I claim separately the screw D, for that is a well known device and is frequently used as a feeder or conveyer, but I am not aware that a taper screw has been used in connection with a toothed cylinder and stopper for the purpose herein set forth.

What I claim therefore as new and desire to secure by Letters Patent, is:

The arrangement and combination, substantially as herein set forth, of the yielding stopper E, taper screw D, toothed cylinder C, and case A, for the purpose specified.

M. W. HELTON.

Witnesses:
MORTON C. HUNTER,
W. J. HUMETON.